US011112050B2

(12) United States Patent
Schneider et al.

(10) Patent No.: US 11,112,050 B2
(45) Date of Patent: Sep. 7, 2021

(54) MULTI-STAGED WATER MANIFOLD SYSTEM FOR A WATER SOURCE HEAT PUMP

(71) Applicant: Lennox Industries Inc., Richardson, TX (US)

(72) Inventors: Steve Schneider, Plano, TX (US); Eric Perez, Hickory Creek, TX (US); Aylan Him, Coppell, TX (US); Miguel Montemayor, Carrollton, TX (US)

(73) Assignee: Lennox Industries Inc., Richardson, TX (US)

( * ) Notice: Subject to any disclaimer, the term of this patent is extended or adjusted under 35 U.S.C. 154(b) by 77 days.

(21) Appl. No.: 16/504,635

(22) Filed: Jul. 8, 2019

(65) Prior Publication Data

US 2019/0331372 A1 Oct. 31, 2019

Related U.S. Application Data

(63) Continuation of application No. 13/316,206, filed on Dec. 9, 2011, now Pat. No. 10,378,800.
(Continued)

(51) Int. Cl.
*F16L 55/055* (2006.01)
*F25B 49/02* (2006.01)
(Continued)

(52) U.S. Cl.
CPC .......... *F16L 55/055* (2013.01); *F04B 49/065* (2013.01); *F04B 49/20* (2013.01); *F24D 3/18* (2013.01); *F24D 17/02* (2013.01); *F24D 19/1039* (2013.01); *F24F 1/36* (2013.01); *F25B 30/02* (2013.01); *F25B 39/04* (2013.01);
(Continued)

(58) Field of Classification Search
CPC .......... F25B 39/04; F25B 30/02; F25B 49/02; F25B 2400/0751; F24D 3/18; F24D 19/1039; F24D 17/02; F24D 2200/123; F24D 2200/24; Y10T 29/49359
See application file for complete search history.

(56) References Cited

U.S. PATENT DOCUMENTS 3,922,876 A 12/1975 Wetherington, Jr. et al.
4,142,379 A 3/1979 Kuklinski
(Continued)

FOREIGN PATENT DOCUMENTS

JP 2007139262 A 6/2007
WO WO-2011005470 A2 1/2011

*Primary Examiner* — Kun Kai Ma
(74) *Attorney, Agent, or Firm* — Shackelford, Bowen, McKinley & Norton, LLP

(57) ABSTRACT

One aspect, as provided herein, is directed to a multi-stage fluid control system for a fluid source heat pump system. This embodiment comprises compressors configured to operate as separate, heat exchange stages, condensers each being fluidly coupled to at least one of the compressors by refrigerant tubing and having intake ends coupled together by a fluid intake manifold. This embodiment further includes output conduits coupled to each of the condensers and that are couplable to a distal location. Further included is a modulating valve control system interposed the output conduits. The modulating valve control system is configured to stage a flow of fluid through the condensers based on a number of operating compressors.

18 Claims, 3 Drawing Sheets

Related U.S. Application Data

(60) Provisional application No. 61/539,344, filed on Sep. 26, 2011, provisional application No. 61/539,358, filed on Sep. 26, 2011.

(51) Int. Cl.
*F24F 1/36* (2011.01)
*F24D 19/10* (2006.01)
*F24D 3/18* (2006.01)
*F25B 39/04* (2006.01)
*F25B 30/02* (2006.01)
*F24D 17/02* (2006.01)
*F04B 49/06* (2006.01)
*F04B 49/20* (2006.01)
*F24F 140/30* (2018.01)
*F24F 11/54* (2018.01)

(52) U.S. Cl.
CPC ............ *F25B 49/02* (2013.01); *F25B 49/027* (2013.01); *F24D 2200/123* (2013.01); *F24D 2200/24* (2013.01); *F24F 11/54* (2018.01); *F24F 2140/30* (2018.01); *F25B 2339/047* (2013.01); *F25B 2400/06* (2013.01); *Y02B 10/70* (2013.01); *Y02B 30/12* (2013.01); *Y02B 30/52* (2013.01); *Y10T 29/49359* (2015.01)

(56) References Cited

U.S. PATENT DOCUMENTS

| | | |
|---|---|---|
| 4,171,621 A | 10/1979 | Trelease |
| 4,238,931 A | 12/1980 | Campbell |
| 4,316,367 A | 2/1982 | Yaeger et al. |
| 4,680,941 A * | 7/1987 | Richardson ............. F24D 17/02 62/184 |
| 5,970,729 A | 10/1999 | Yamamoto et al. |
| 6,076,369 A | 6/2000 | Ochi et al. |
| 6,161,394 A * | 12/2000 | Alsenz ................. F25B 49/027 62/184 |
| 6,427,460 B1 | 8/2002 | Zanon |
| 6,604,376 B1 | 8/2003 | Demarco et al. |
| 7,856,835 B2 | 12/2010 | Ida |
| 2006/0010893 A1 | 1/2006 | Dominguez |
| 2006/0090507 A1 | 5/2006 | Taras et al. |
| 2006/0266074 A1 | 11/2006 | Groll et al. |
| 2007/0130976 A1 | 6/2007 | Akehurst et al. |
| 2007/0199337 A1* | 8/2007 | Otake ..................... F24D 17/02 62/183 |
| 2007/0246555 A1* | 10/2007 | Nishimura .......... F24D 11/0214 237/2 B |
| 2008/0041072 A1 | 2/2008 | Seefeldt |
| 2008/0083237 A1 | 4/2008 | Street et al. |
| 2009/0211282 A1 | 8/2009 | Nishimura et al. |
| 2009/0236493 A1 | 9/2009 | Minemoto et al. |
| 2009/0288432 A1 | 11/2009 | Lifson et al. |
| 2010/0121495 A1 | 5/2010 | Okoren et al. |
| 2010/0131106 A1 | 5/2010 | Kriangkanont |
| 2010/0186604 A1 | 7/2010 | Otake et al. |
| 2010/0192606 A1 | 8/2010 | Isayama et al. |
| 2010/0298982 A1 | 11/2010 | Chamorro et al. |
| 2011/0088421 A1 | 4/2011 | Wakamoto et al. |
| 2011/0197610 A1* | 8/2011 | Debesa .................. F28D 7/022 62/238.7 |
| 2011/0289952 A1 | 12/2011 | Kim et al. |
| 2012/0180986 A1 | 7/2012 | Mathews |
| 2013/0025301 A1 | 1/2013 | Maitani et al. |

* cited by examiner

MULTI-STAGED WATER MANIFOLD SYSTEM FOR A WATER SOURCE HEAT PUMP

CROSS-REFERENCE TO RELATED APPLICATION

This application is a continuation of U.S. patent application Ser. No. 13/316,206, filed on Dec. 9, 2011. U.S. patent application Ser. No. 13/316,206 claims priority from U.S. Provisional Application No. 61/539,344, filed on Sep. 26, 2011 and U.S. Provisional Application No. 61/539,358, filed on Sep. 26, 2011. U.S. patent application Ser. No. 13/316, 206, U.S. Provisional Application Nos. 61/539,344, and 61/539,358 are incorporated herein by reference.

TECHNICAL FIELD

This application is directed, in general, to a water source heat pump (WSHP) and, more specifically, to a WSHP having a multi-stage fluid delivery system.

BACKGROUND

Water source heat pumps are presently used in large commercial or residential buildings' cooling systems. These WSHP units capture waste heat from refrigeration-racks and use it to heat stores in winter and reduce peak loading in summer. Also, these systems are very similar to chiller systems that are also well known with the exception that they can also run in a reverse cycle and function as a heat pump, thereby allowing them to function for both winter and summer heating/cooling applications. Basically, the unit uses a refrigerating system to cool or heat water, which is used as a heat exchange mechanism to remove or add heat to the system. The water passes through a condensing coil and removes heat from the refrigerant before passing through the expansion valve. These units are desirable because they are more efficient in heating and cooling large commercial or residential spaces, than standard cooling and heating systems. Though these units are effective in providing heating and cooling to the building intended to be cooled or heated, they are less efficient than desirable, given present day concerns to reduce both power and water use or consumption.

SUMMARY

One embodiment, as provided herein, is directed to a multi-stage fluid control system for a fluid source heat pump system. This embodiment comprises compressors configured to operate as separate, heat exchange stages, and condensers that are each fluidly coupled to at least one different compressor by refrigerant tubing. The condensers have intake ends that are coupled together by a fluid intake manifold. This embodiment further includes output conduits that are coupled to each of the condensers and that are couplable to a distal location. Further included is a modulating valve control system interposed the output conduits. The modulating valve control system is configured to stage a flow of fluid through the condensers based on a number of operating compressors.

Another aspect is direct to a different embodiment of a multi-stage water control system for a water source heat pump. This embodiment comprises compressors that are fluidly coupled to one or more evaporators and condenser units having intake ends that are fluidly coupled together by a manifold. Each of the condenser units are fluidly coupled to a different one of the compressors by refrigerant tubing to form multiple, separate refrigeration loops. This embodiment further includes a water intake conduit coupled to the manifold and output conduits coupled to each of the condenser units. Each of the output conduits has a water control valve interposed therein. A controller is coupled to the water control valves and is configured to control the water control valves to stage a flow of water through the condensers based on a number of the compressors that are operating.

Another embodiment is directed to a method of manufacturing a multi-stage fluid control system for a fluid source heat pump system. This embodiment comprises placing compressors on a housing frame that are configured to operate as separate, heat exchange stages, placing condensers on the housing frame and fluidly coupling each of them to at least one of the compressors by refrigerant tubing. The condensers have intake ends that are coupled together by a fluid intake manifold. The method further comprises coupling output conduits to each of the condensers that are couplable to a distal location, and interposing a modulating valve control system in the output conduits. The modulating valve control system is configured to stage a flow of fluid through the condensers based on a number of operating compressors.

BRIEF DESCRIPTION

Reference is now made to the following descriptions taken in conjunction with the accompanying drawings, in which.

DETAILED DESCRIPTION

Figure 1:
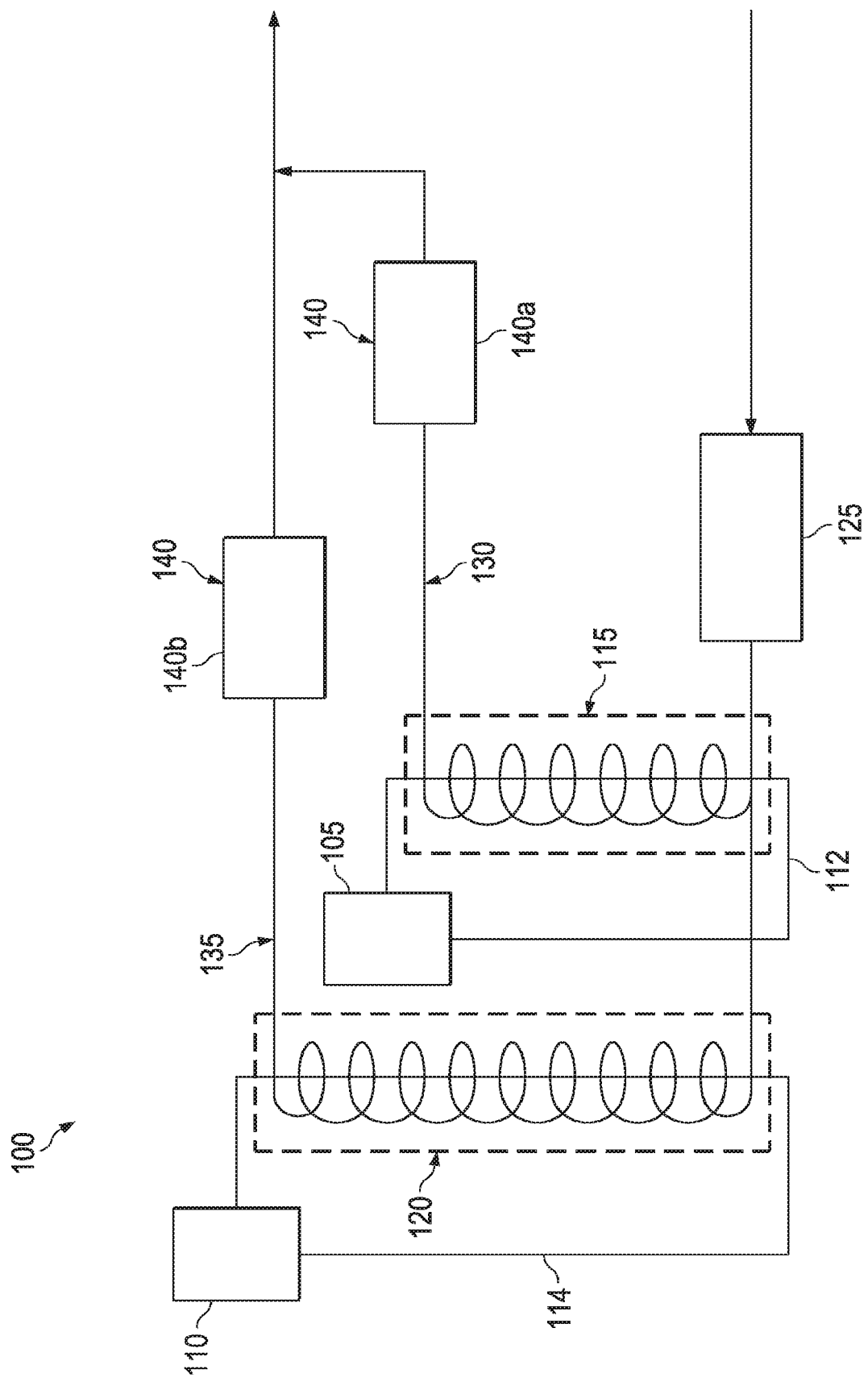
FIG. 1 illustrates a schematic diagram showing the multi-stage configuration of the heat pump system as provided herein.

FIG. 1 illustrates a schematic diagram of a multi-stage fluid control system for a fluid WSHP unit 100 as covered by the embodiments discussed herein and which can be used in conjunction with a conventional roof top unit (RTU). For purposes of understanding this disclosure and claims, it should be understood that the term "refrigerant" pertains to the refrigerant fluid flowing through the compressors 105, 110 (each comprising one or more compressors) and "fluid" pertains to any heat exchange fluid flowing through the condensers 115, 120. This particular embodiment comprises compressor 105, 110 that are configured to operate in separate, heat exchange stages. The compressors 105, 110, may be of conventional design and are operated in separate cycles, or when more than two compressors are present, multiple compressors may be operated at the same time. For example, if four compressors are present, two compressors may be operated together in a first operation cycle or stage, and the remaining two compressors may be operated together in a second operation cycle or stage. Alternatively, the four compressors may operate in separate, first, second, third and fourth stages. As used herein and in the claims, "stage" means a refrigerant cycle operation where the compressor is operating and refrigerant is passing through the associated condenser, and heat exchange is occurring between the refrigerant flowing through the compressors 105, 110 and the fluid, such as water, glycol, or some other known heat exchanging fluid, passing through the condensers 115 or 120.

Condensers 115, 120 are each fluidly coupled to least one different compressor 105 or 110 by refrigerant tubing 112, 114, to form separate refrigerant cycles with the compressor to which the condenser 115, 120 is coupled. In certain embodiments, each of the condensers 115, 120 is coupled to a different compressor 105, 110, however, in other embodiments, one of the condensers 115, 120 may be coupled to more than one compressor. The condensers 115, 120 have intake ends coupled together by a fluid intake manifold 125. The manifold 125 is common to the condensers 115, 120 and provides fluid flow into the condensers 115, 120. Also the condensers 115, 120 may be of conventional design, such as concentric coil condensers, as those illustrated herein, or they may be a conventional brazed-plate condenser. The condensers 115, 120 are designed to have separate refrigerant and fluid paths through which heat exchange occurs. Moreover, it should be understood that while only two compressors and two condensers are shown, the present disclosure is not limited to this particular numerical design and is expandable to accommodate different heat/cooling needs of a given structure.

This embodiment further includes output conduits 130, 135, respectively, coupled to each of the condensers 115, 120. The output conduits 130, 135 are couplable to a distal location, which is a location outside the heat pump system 100, such as a user's building or cooling tower or RTU. The output conduits 130, 135 can be joined together downstream from the condensers 115, 120 to provide a common conduit to the distal location, as shown. Further included, is a modulating valve control system 140 interposed the output conduits 130, 135. The modulating valve control system comprises separate modulating valves 140a, 140b that are interposed the conduits 130, 135 of the respective condensers 115, 120 with which it is associated. Modulating valves 140a, 140b are capable of proportionally controlling water by going from fully open to fully closed; or by going from a water flow setpoint determined by a RTU unit controller to a closed position (no water flow) determined by the RTU controller. Water setpoint is a flow in gallons per minute (GPM) or on a temperature drop (Delta T) through the water cooled condenser. This value can either be factory set or field/customer configurable. This represents a significant cost savings by not having to have dedicated automatic temperature controllers (ATC's) or automatic temperature/flow controls on each water/refrigerant stage in addition to the motorized on/off shut off valve. Additionally, as explained below, in other embodiments, the modulating valve control system 140 may also include a controller that can comprise one or more microprocessors. The modulating valve control system 140 is configured to control a flow of fluid through the condensers 115 or 120, based on the required operation of the compressor 105 or 110 to which the condenser 115 or 120 is respectively coupled.

For example, in a stage 1 heat exchange cycle and just before the compressor 105 is activated, a signal goes out to the modulating valve control system 140, which causes the valve 140a to open. This allows a flow of fluid to begin flowing through condenser 115 for a short period of time and charge the condenser 115 with fluid. Following this brief period of time, compressor 105 is then activated. During stage 1, valve 140b remains in the closed position, as long as there is not a need to activate compressor 110 with which condenser 120 is associated, thereby preventing a flow of fluid through condenser 120. However, if there is a call from a controller for stage 2 operation, a signal goes out to the modulating valve control system 140, which causes the valve 140b to open, just prior to the activation of compressor 110, which allows condenser 120 to be charged with fluid. The opening of the valve 140b allows a flow of fluid through condenser 120 during the operation of compressor 110. Thus, where there is only a need for stage 1 operation, fluid is flowing only through the condenser 115, which is associated with compressor 105. Alternatively, when there is a need for both stage 1 and stage 2 operation, fluid is flowing through both of the condenser 115, 120 during the operation of compressors 105, 110.

In view of the above, fluid flow through the condensers 115, 120 is controlled by the valve control system 140 in such a way that only the fluid that is needed to meet heating/cooling requirements is pumped through the condenser associated with the operating compressor. This is in stark contrast to conventional, single stage systems where fluid flows through each condenser regardless of which compressor stage is operating. In such conventional systems, no staged multiple valve controls are present, so fluid is flowing through all the condensers when any one of the compressors is operating. As such, there is no staging of fluid flow through the condensers with the operation of the compressors. As a result, all of the fluid pumps run at all times during the operation to maintain the required pump pressure within the system. This constant pump operation requires more pump energy than the embodiments provided by this disclosure.

Figure 2:
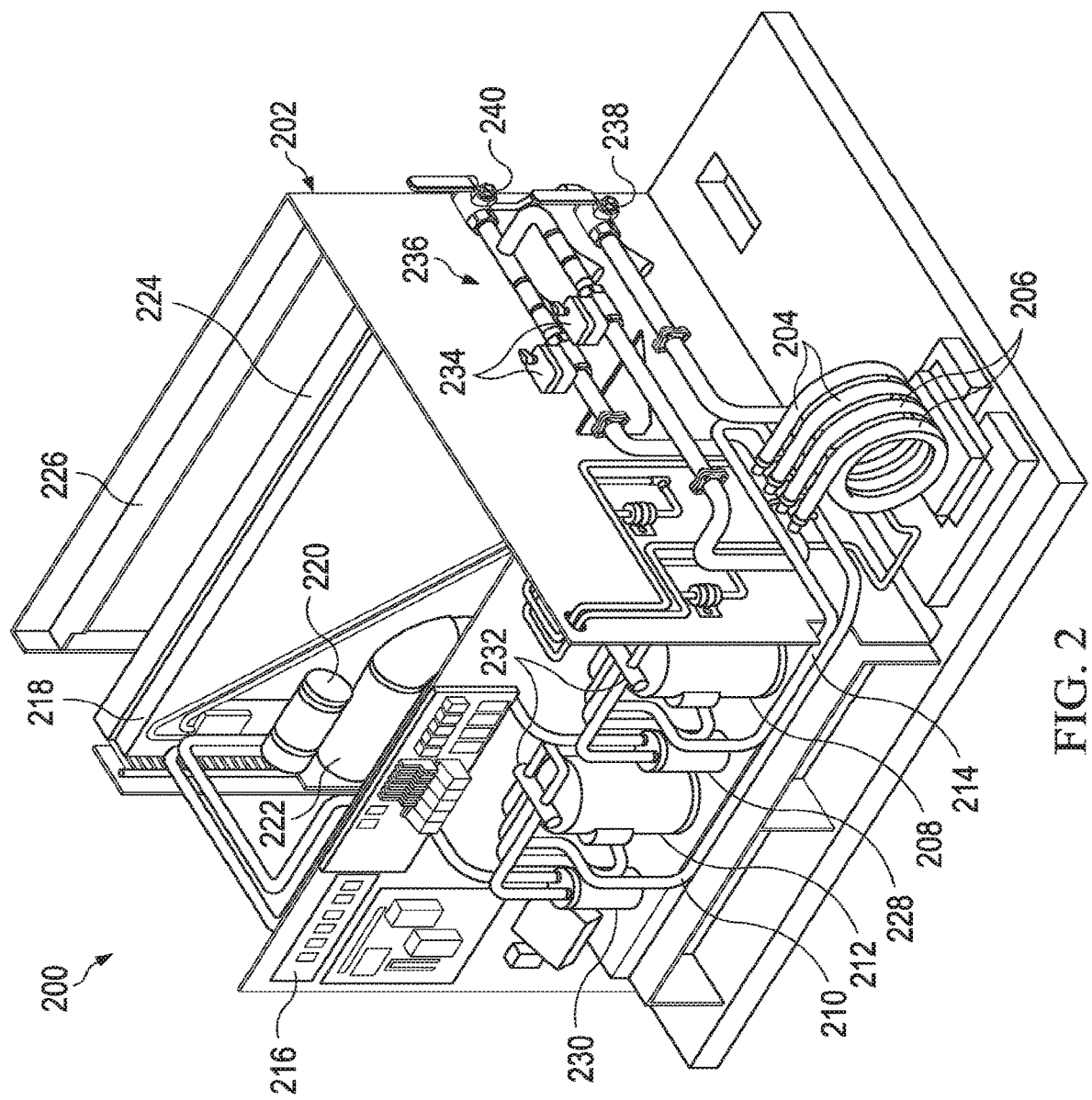
FIG. 2 illustrates a perspective view of one embodiment of a WSHP according to FIG. 1.

In operation, fluid, such as water from a distal location, is pumped toward the WSHP unit 100. In a cooling operation mode, the refrigerant within each refrigeration circuit leaves the associated compressor as a hot gas. When the hot refrigerant gas passes through the refrigerant path within condensers 115 or 120, it transfers heat to the fluid that flows through a fluid path within the condensers 115 or 120. The refrigerant becomes cooler and turns to a liquid state before passing through an expansion vale, not shown, after which it quickly expands into a cold gas as it passes through an evaporator or indoor coil as seen in FIG. 2, as described below. Of course, in a heating mode, the above described cycle is reversed to provide heat to the indoor coils.

As noted above each stage 1 (compressor 105 and condenser 115) and stage 2 (compressor 110 and condenser 120) has separate modulating control valves 140a and 140b associated with them. As such, these modulating control valves 140a and 140b control the fluid through the condensers 115, 120 in a staged manner, such that only the condensers associated with active refrigeration circuits have refrigerant and fluid passing through them. Moreover, modulating control valves 140a and 140b can be specifically designed to include a motorized actuator, automatic flow control, and 3-way valves (for by-pass). In such embodiments, the motorized actuators are opened when the respective compressors are energized with T-stat demand signals Y1, Y2, . . . and W1, W2 . . . , etc. The condensers 115, 120, which are, in certain embodiments, arranged in a parallel arrangement, are coupled together by the manifold. 125 so that fluid is able to flow though only the condenser that has an active refrigeration circuit. Thus, a matching in refrigerant flow with fluid flow can be achieved, and only fluid that is doing the work will be pumped at any given point in time. Moreover, these systems can provide a variable flow rate and allow the flow rate to be staged to coincide with the number of active compressors within the system at any given point in time, which provides significant pump volume and energy savings. The flow rate is reduced and that in turn has a significant impact to the pump horse power, which results in energy savings.

With the present disclosure, it has been found that staging the fluid through the condensers 115, 120 provides a system that saves energy, by reducing the fluid required to run the pumps by up to about 50% in part load conditions in a two compressor system. This translates to about 86% savings in pump energy, when using a typical speed controlled centrifugal pump water system. Moreover, in a four compressor system, flow rate reduction can be increased further, even up to about 75%, which can translate into as much as about 97% savings in pump energy, when using a typical centrifugal pump water system. As such, this unique configuration allows not only a reduction of fluid flow but a significant pump energy savings over conventionally designed systems.

FIG. 2 illustrates one configuration of the WSHP system 100, as generally discussed above. In this embodiment, a WSHP unit 200 includes a housing frame 202 on which the various components of the WSHP system 200 are placed, and the condensers mentioned above regarding FIG. 1 are water condenser coils 204, 206, wherein each of the condenser coils 204, 206 includes two coils. The condenser coils 204, 206 may be of conventional design with each of the dual coils comprising two concentric tubes that form a separate refrigerant path and fluid path within them. As shown, condenser coil 204 is coupled to compressor 208 by refrigerant tubing 210 to form a first refrigerant cycle, or stage 1, and condenser coil 206 is coupled to compressor 212 by refrigerant tubing 214 to form a second refrigerant cycle, or stage 2. Though only two compressors and two coils are shown, it should be understood that the system can be expanded to include multiple coils and compressors in a 1:1 coil/compressor ratio. As such, the system can easily be expanded for increased capacity as design requires.

The two above-mentioned stages share a common intake water manifold, not shown in this view that is located at the bottom of the condensing coils 204 and 206 and supplies water to both coils. The first and second stage condensing coils 204, 206 form separate fluid paths and the water, though taken in through the common manifold, is not intermixed once the fluid enters each of the stage 1 and stage 2 coils 204, 206. The stage 1 and stage 2 condensing coils 204, 206 are comprised of concentric tubes in which the most center tube forms the water path and the outer, larger concentric tube forms the refrigerant path. The temperature difference between the refrigerant and water flowing through the concentric tubes allows for the heat exchange to occur. The operations of the WSHP unit 200, as described herein, are controlled by an unit controller 216 and can include the programming and one or more microprocessors and microcircuits boards necessary to implement the embodiment described herein.

Compressors 208 and 212 are fluidly connected to an indoor evaporator coil 218 through which air is directed by a motor 220 and fan 222 through filter 224 and an optional economizer damper 226. The illustrated embodiment also includes a conventional first charge compensator 228 associated with compressor 208 and a conventional second charge compensator 230 associated with compressor 212. The compressors 208 and 212 also have first and second reverse valves 232, respectively associated therewith to allow the refrigerant flow direction, and subsequently the refrigeration cycle in the unit to be operated in reverse. The unit 200 further includes the valve control system 234, conduit system 236, including water input and outputs 238, 240, which are explained in more detail below.

Figure 3:
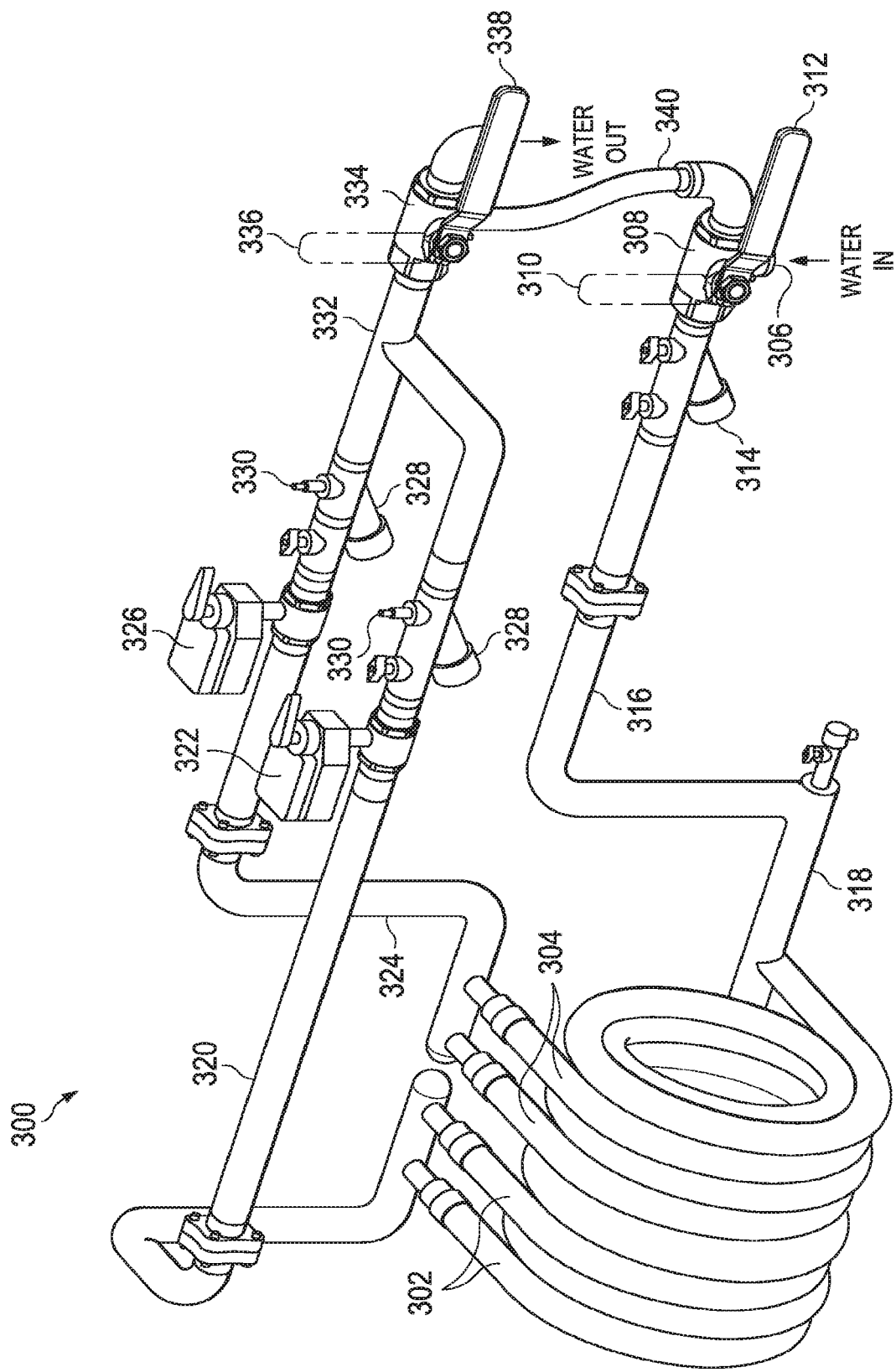
FIG. 3 illustrates a perspective view of one embodiment of the fluid control system associated with the WSHP of FIG. 2.

FIG. 3 is a partial view of the WSHP unit 200 of FIG. 2 that illustrates the condensers, conduits, and valve control system 300 of the WHSP unit 200. In this embodiment the system 300 has a two stage quad condensing coil configuration wherein each stage includes two condensing coils 302, 304. This embodiment further illustrates a common water inlet point 306 that is couplable to a water source from a distal use point, such as a uses structure or cooling tower. The water can pass through a three-way valve 308 that is positioned in a by-pass position. 310 or a main loop position 312. The three-way valve 308 is connected to a strainer 314 that moves foreign debris from the water flowing through the system 300. Conduit pipe 316 leads from the strainer 314 to a manifold 318 that feeds both the condensing coils 302, 304. The stage 2 coil 302 is connected by a conduit 320, on its outlet side, to a stage 2 flow control valve 322, and the stage 1 coil 304 is connected by conduit 324, on its outlet side, to a stage 1 flow control valve 326, as shown. The separate outlet conduits 320 and 324 and control valves 322 and 326 allow for a staging of the water flow through the WSHP system 200 of FIG. 2, as explained above. Once the water passes through either one or both of the control valves, it first passes through automatic flow regulator and air event sections 328, 330, after which, conduits 320 and 324 merge into a single conduit 332. The water then passes through three-way valve 334 and to the distal point of use, provided the three-way valve 334 is in a main loop position 336. However, if the three-way valve 306, 334 is in the by-pass position 310, 338, the water travels through the flexible hose 340 and back out of the unit, by-passing the condensers, conduits and valve control systems. By-pass mode provides advantages during water system commissioning and start up, by allowing external water-loop connections in the building to pressure checked, flushed and drained without exposing any of the flow control and condenser heat exchanger to potentially damaging high-air pressures. It's common practice to use high pressure and non chemically treated water to flush contaminants from the building water loop piping systems during the startup process. If the WSHP is left connected during the flushing process there is the potential to expose the WSHP to a high concentration of contaminants and cleaners could potentially damage the copper and brass materials that are commonly used in water cooled condenser flow control and heat transfer systems. Another advantage of having a flow-control system w/a built-in bypass mode is the ability to repair and/or replace systems down-stream of the main water loop w/o having to disconnect the connection points between the buildings's main water loop and the RTU.

The foregoing presents embodiments of an improved WSHP that allows staging of the condensers in tandem with only the compressors that are operating. This reduces pump energy in that pump pressure is reduced and allows significant savings in energy costs and water consumption in the operation of the WSHP unit. Moreover, this savings in pump energy, derived from restricting fluid flow to non-active condenser circuits does not impact the operations efficiency of the refrigeration system.

Those skilled in the art to which this application relates will appreciate that other and further additions, deletions, substitutions and modifications may be made to the described embodiments.

The invention claimed is:

1. A multi-stage fluid control system for a fluid source heat pump system, comprising:
a first heat exchange stage comprising:

a first heat exchange stage compressor and a first heat exchange stage refrigerant tubing configured to hold a first refrigerant;

a first heat exchange stage condenser fluidly coupled to the first heat exchange stage compressor to receive the first refrigerant via the first heat exchange stage refrigerant tubing, the first heat exchange stage condenser comprising a first heat exchange stage condensing coil for circulating fluid; and a first heat exchange stage modulating valve control system coupled to a first heat exchange stage fluid output conduit;

a second heat exchange stage, comprising:
a second heat exchange stage compressor and a second heat exchange stage refrigerant tubing configured to hold a second refrigerant;

a second heat exchange stage condenser fluidly coupled to the second heat exchange stage compressor to receive the second refrigerant via the second heat exchange stage refrigerant tubing, the second heat exchange stage condenser comprising a second heat exchange stage condensing coil for circulating the fluid; and a second heat exchange stage modulating valve control system coupled to a second heat exchange stage fluid output conduit;

wherein the first heat exchange stage modulating valve control system is configured to modulate a first valve of the first heat exchange stage modulating valve control system between a first and second position of the first valve;

wherein the second heat exchange stage modulating valve control system is configured to modulate a second valve of the second heat exchange stage modulating valve control system between a first and second position of the second valve; and wherein the first and second heat exchange stage modulating valve control systems are configured to stage a flow of the fluid through the first and second heat exchange stage condensers based on a number of compressors that are operating;

wherein the first position of the first valve is a flow setpoint determined by the first heat exchange stage modulating valve control system and the second position of the first valve is a closed position; and wherein the first position of the second valve is a flow setpoint determined by the second heat exchange stage modulating valve control system and the second position of the second valve is a closed position.

2. The multi-stage fluid control system of claim 1, wherein each of the first and second heat exchange stage condensing coils is coupled to two or more compressors.

3. The multi-stage fluid control system of claim 1, wherein:
the first heat exchange stage condensing coil comprises a first heat exchange stage fluid intake end coupled to a fluid intake manifold that receives the fluid from a first distal location;

a first heat exchange stage fluid exit end coupled to the first fluid output conduit that is couplable to a second distal location; and the first heat exchange stage condensing coil is operable to transfer heat from the first refrigerant to the fluid.

4. The multi-stage fluid control system of claim 3, wherein:

the second heat exchange stage condensing coil comprises a second heat exchange stage fluid intake end coupled to the fluid intake manifold;

a second heat exchange stage fluid exit end coupled to the second heat exchange stage fluid output conduit that is couplable to the second distal location; and the second heat exchange stage condensing coil is operable to transfer heat from the second refrigerant to the fluid.

5. The multi-stage fluid control system of claim 1, wherein the first heat exchange stage modulating valve control system includes one or more microcontrollers configured to operate the first valve of the first heat exchange stage modulating valve control system; and the second heat exchange stage modulating valve control system includes one or more microcontrollers configured to operate the second valve of the second heat exchange stage modulating valve control system.

6. The multi-stage fluid control system of claim 1, wherein the second heat exchange stage modulating valve control system includes one or more microcontrollers configured to operate the second valve of the second heat exchange stage modulating valve control system.

7. The multi-stage fluid control system of claim 1, wherein the first heat exchange stage modulating valve control system is configured to set the first valve of the first heat exchange stage modulating valve control system in the first position to allow the fluid to flow to the first heat exchange stage condenser when the first heat exchange stage compressor is operating.

8. The multi-stage fluid control system of claim 1, the second heat exchange stage modulating valve control system is configured to set the second valve of the second heat exchange stage modulating valve control system in the first position to allow the fluid to flow to the second heat exchange stage condenser when the second heat exchange stage compressor is operating.

9. The multi-stage fluid control system of claim 1, further comprising an intake conduit coupled to the fluid intake manifold, the intake conduit configured to be couplable to a second distal location.

10. A multi-stage water control system for a water source heat pump, comprising:
at least two compressors, each compressor of the at least two compressors being coupled to a refrigerant tubing for circulating refrigerant;

at least two condensers, each having a condensing coil with a water intake end, the at least two condensers being fluidly coupled together by a manifold;

a water intake conduit coupled to the manifold;

a first water output conduit coupled to a first condensing coil of the at least two condensing coils and a second water output conduit coupled to a second condensing coil of the at least two condensing coils;

a three-way valve coupled to each of the condensing coils of the at least two condensers and operable to divert fluid from inlets of each of the condensing coils to an outlet; and a controller coupled to each a first water control valve and a second water control valve and configured to operate each of the first and second water control valves in a first position and a second position, wherein the first position is a flow setpoint determined by the controller and the second position is a closed position.

11. The multi-stage water control system of claim 10, wherein each condensing coil of each of the at least two condensers is coupled to two or more compressors.

12. The multi-stage water control system of claim 10, wherein each condenser of the at least two condensers being fluidly coupled to a different one of the at least two compressors and each condenser of the at least two condensers configured to receive the refrigerant from the refrigerant tubing to form multiple, separate refrigeration loops, the at least two condensers configured to transfer heat from the refrigerant to water.

13. The multi-stage water control system of claim 10, wherein each of the first and second water output conduits comprise first and second water control valves, respectively, interposed therein.

14. The multi-stage water control system of claim 10, wherein the controller is configured to control the first and second water control valves to stage a flow of water through one or both of the at least two condensers based on a number of compressors of the at least two compressors that are operating.

15. The multi-stage water control system of claim 14, wherein the controller comprises one or more microcontrollers for controlling the first and second water control valves.

16. The multi-stage water control system of claim 14, wherein the controller is configured to:
open the first water control valve for the fluid to flow to a first condenser of the at least two condensers only when a first compressor of the at least two compressors is operating.

17. The multi-stage water control system of claim 14, wherein the controller is configured to:
open the second water control valve for the fluid to flow to a second condenser of the at least two condensers only when a second compressor of the at least two compressors is operating.

18. The multi-stage water control system of claim 10, wherein the water intake conduit is configured to be couplable to a distal location.

* * * * *

UNITED STATES PATENT AND TRADEMARK OFFICE
CERTIFICATE OF CORRECTION

PATENT NO. : 11,112,050 B2
APPLICATION NO. : 16/504635
DATED : September 7, 2021
INVENTOR(S) : Steve Schneider et al.

Page 1 of 1

It is certified that error appears in the above-identified patent and that said Letters Patent is hereby corrected as shown below:

In the Specification

Column 6, Line 8: Replace "such as a uses structure or cooling tower."
With -- such as a user's structure or cooling tower. --

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*